April 8, 1941.  T. L. HEDGPETH  2,237,556
MITER GAUGE
Filed Feb. 27, 1939  3 Sheets-Sheet 1

Inventor.
Theron L. Hedgpeth
By Williams, Bradbury, McCaleb & Hinkle Attys.

April 8, 1941.                T. L. HEDGPETH                2,237,556
                                MITER GAUGE
                            Filed Feb. 27, 1939           3 Sheets-Sheet 2
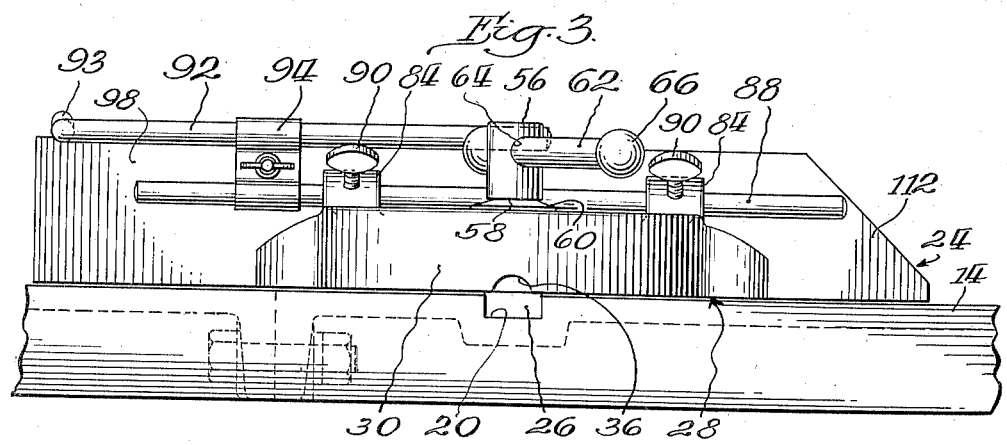
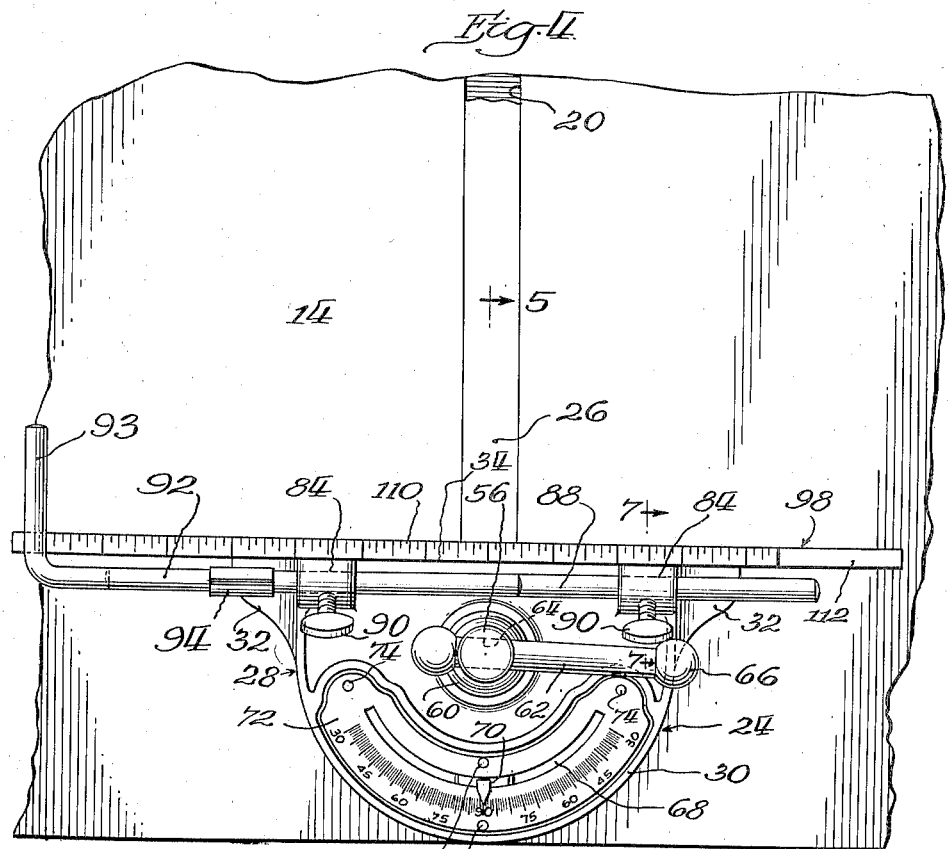
Inventor
Theron L. Hedgpeth
By Williams, Bradbury, McCaleb & Hinkle
Attys April 8, 1941.  T. L. HEDGPETH  2,237,556
MITER GAUGE
Filed Feb. 27, 1939  3 Sheets-Sheet 3
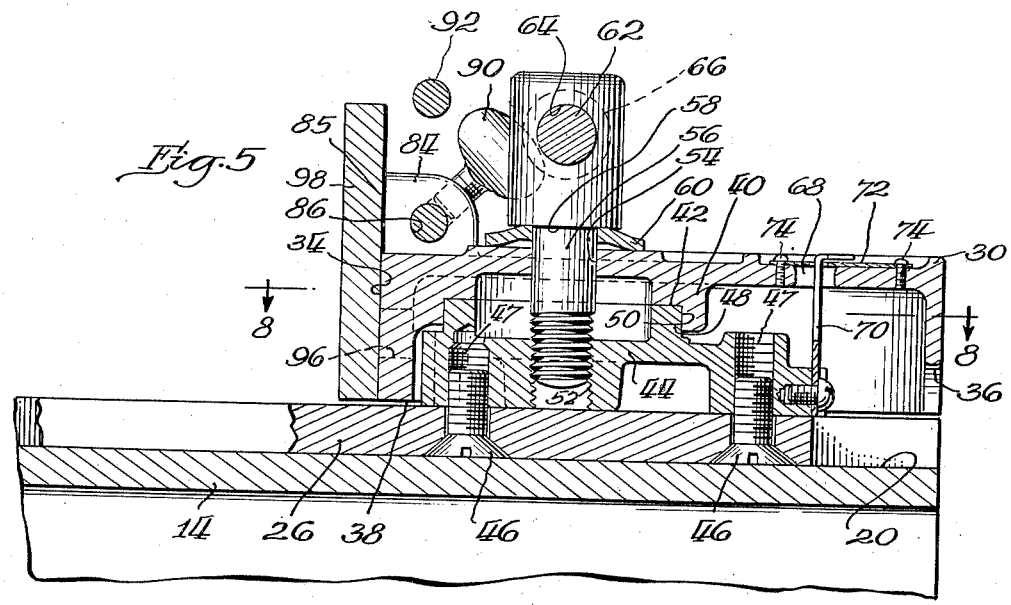
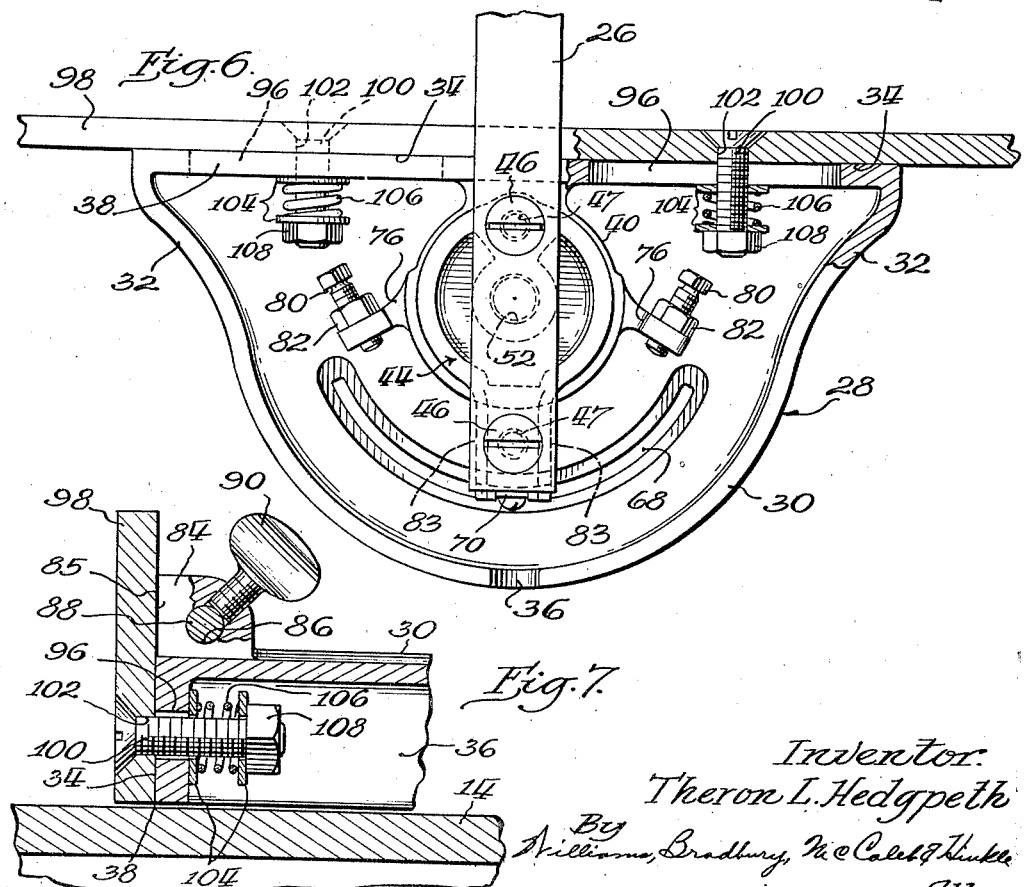
Inventor:
Theron L. Hedgpeth
By Williams, Bradbury, McCaleb & Hinkle
Attys.

Patented Apr. 8, 1941

2,237,556

UNITED STATES PATENT OFFICE 2,237,556

MITER GAUGE

Theron L. Hedgpeth, Oak Park, Ill., assignor to Duro Metal Products Company, Chicago, Ill., a corporation of Illinois Application February 27, 1939, Serial No. 258,668

2 Claims. (Cl. 143—169)

The present invention contemplates and provides an improved miter gauge of the type adapted for use with circular saws, band saws, shapers, disc sanders, belt sanders, and like powered work shop tools. While such devices are commonly known as miter gauges, their use is not restricted to mitering alone, but they have the more general application of guiding work pieces past the cutter or other active member of the power tool at the proper angle.

Miter gauges, in general, consist of a bar which slides in and is guided by a groove in the top of the machine tool table and a head portion which is pivoted near one end of the bar. The head portion has a vertical plane machined surface against which the work is held as the gauge is moved across the table. In use the head is moved around its pivot until the proper angular relation is assumed between the bar and the above-mentioned vertical plane surface. When properly set, some sort of clamping means is utilized to secure the head and the bar together until resetting is desired. As an aid to setting, the head usually carries an arcuate scale which reads in conjunction with a pointer attached to the bar.

It is an object of the present invention to provide a novel miter gauge of the above general type which overcomes the objection of crawling commonly encountered in miter gauges generally available at present.

An additional object is to provide a novel miter gauge that enables the use of a longer face plate against which the work is held than can ordinarily be used, and in which the face plate can always clear the active element by the proper amount, even though the position of the gauge is reversed, or the angular relationship altered.

Another object is to provide an improved miter gauge having a long adjustable face plate in which the face plate maintains proper angularity with respect to the bar during adjustment.

Still another object is to provide an improved miter gauge with an adjustable face plate in which the face plate may be quickly and easily adjusted without the use of tools.

An additional object is the provision of stops to locate accurately and quickly certain often used angular settings, and in which the stops, although easily adjustable, are nevertheless so placed that they cannot catch in the clothing or become bumped out of adjustment.

Still another object is the provision at comparatively low cost of a novel miter gauge having the above and additional features without sacrificing any worth-while features.

Other objects and advantages of the invention will be apparent from the following description and the accompanying drawings, in which similar characters of reference indicate similar parts throughout the several views.

Referring to the drawings accompanying this specification:

Fig. 3 is an end view of a miter gauge embodying the present invention shown in position on a saw table, a fraction only of the saw table being illustrated;

Fig. 4 is a top view of the miter gauge shown in Fig. 3;

Fig. 5 is a sectional view which may be considered as taken in the plane of the line 5—5 in the direction indicated by the arrows;

Fig. 6 is a bottom view of the miter gauge shown with a portion of the bar and the face plate broken away;

Fig. 7 is a sectional view taken in the direction indicated by the arrows in the plane of the line 7—7 of Fig. 4.

Although the miter gauge comprising this invention is adapted to be used with various types of machine tools, in the interest of clarity and brevity, only its use with a table saw will be described here, inasmuch as its use with other machine tools is similar and will be understood.

Figure 1:
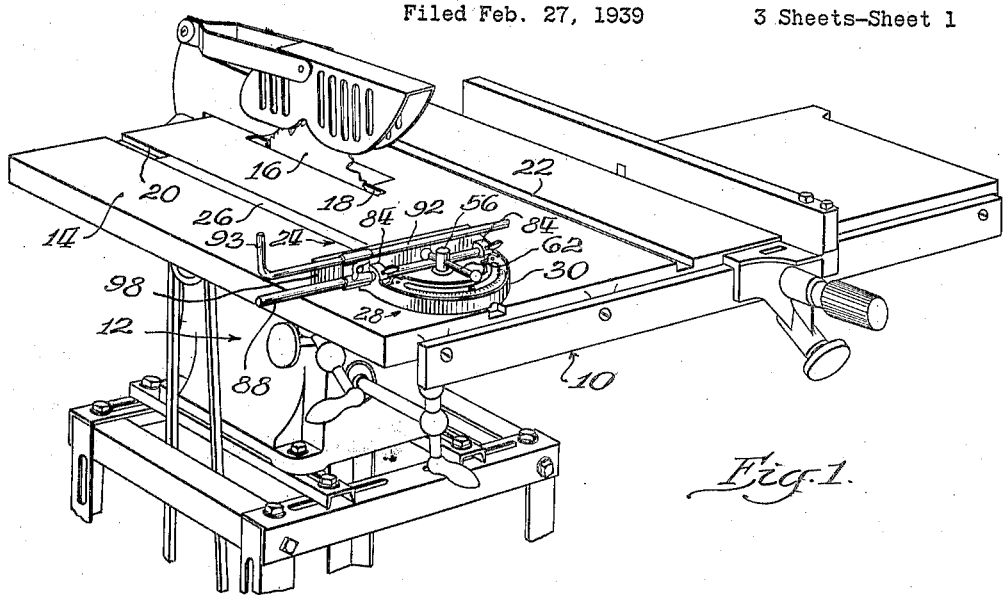
Fig. 1 is a perspective view of a table saw showing the miter gauge in position for use in making a square cut.
Figure 8:
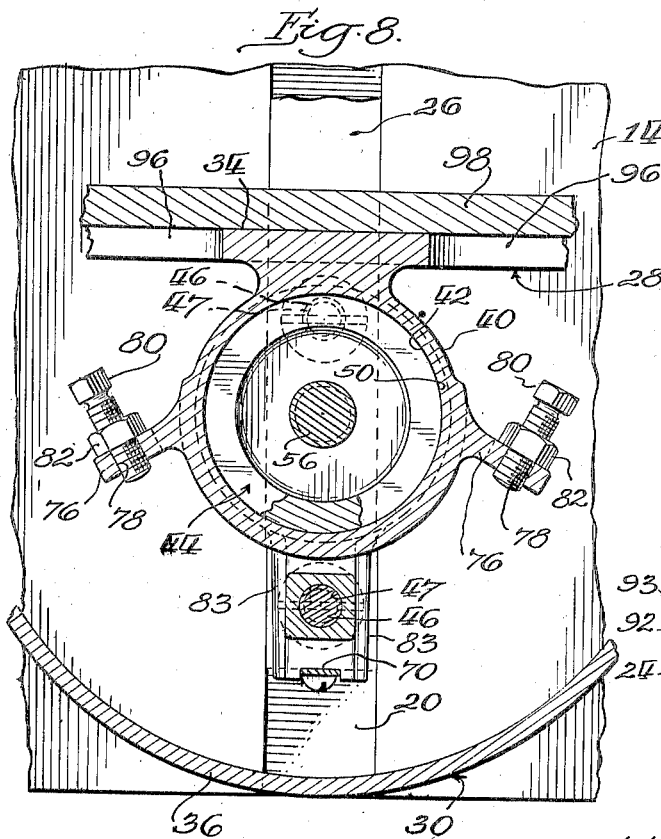
Fig. 8 is a sectional view which may be considered as taken in the plane of the line 8—8, looking downwardly as indicated by the arrows.
Figure 2:
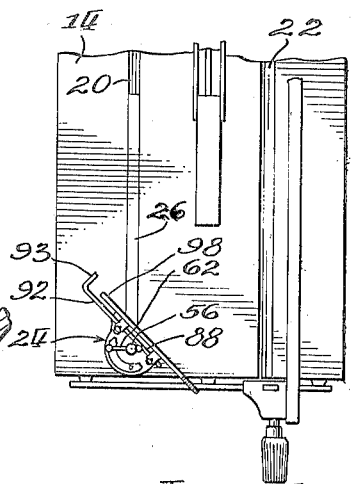
Fig. 2 is a top view of a fraction of the saw table seen in Fig. 1 showing the miter gauge in position to make a cut at 45 degrees.

Referring to Fig. 1, the numeral 10 indicates a table saw in its entirety, consisting essentially of a base 12, a table 14 supported thereon, and a circular saw blade 16, the upper portion of which extends through a slot 18 in the top of the table. The top of the table is provided with two machined grooves 20 and 22 therein parallel to the plane of the saw blade and positioned with one on each side of the saw. These grooves extend from the front to the back of the table and are used in conjunction with a miter gauge, denoted generally by the numeral 24, to guide the work past the saw blade.

The miter gauge 24, which is the subject of the present invention, comprises a rectangular bar 26 adapted to fit the table groove 20 and a head or body 28 attached to one end of the bar in a manner to permit it to swivel thereabout in a horizontal plane.

The largest element of the head 28 is a sand or die casting 30 which is generally semicircular in shape but flared outwardly somewhat at 32 near the ends of the arcuate portion. The forward or leading edge of the head 28 is ground to form a plane face plate supporting surface 34 at right angles to the surface of the table 14, when the gauge is laid upon the table with the bar 26 in the groove 20.

The inside of the head is generally hollow and shaped to provide a flange 36 around the periphery of the casting. This flange 36 should extend downwardly far enough to give strength and rigidity to the casting, but should not come in contact with the surface of the table since this portion of the casting need not be finished true. The flange that provides the bearing plate support surface 34, however, preferably should extend within about $\frac{1}{32}$ of an inch of the table and have a ground lower surface 38 at right angles to the vertical surface 34 so as to prevent any substantial rocking of the head from side to side when in use and to permit the use of the gauge with very thin stock.

At the center of curvature of the arc formed by the rear portion of the casting, the head is provided with a downwardly extending boss 40 provided with a finished annular seat 42 upon which the head is supported.

A swivel 44, preferably made as a casting, is secured by screws 46 extending into tapped holes 47 to the rear end of the bar 26 and has an upwardly projecting boss 48 machined at 50 to fit closely inside the annular seat 42, so that the head may swivel freely without appreciable side play. A vertical threaded opening 52 extends through the swivel 44 at the center of rotation of the head.

Directly above the threaded opening 52, the head has a drilled hole 54 through which a clamp screw 56 extends with the lower portion of the screw threaded into the opening 52. Above the upper surface of the head the clamp screw 56 is provided with a shoulder 58 to clamp against a spring washer 60 positioned between the shoulder 58 and the upper surface of the head. Thus, by loosening the clamp screw 56, the head may be rotated freely into any desired angular position and there secured by tightening the screw.

To aid the operator in loosening and tightening the clamp screw, a bar 62 extends radially through a hole 64 in the top portion thereof. This bar is freely movable axially and carries a knob 66 at each end to prevent the bar from becoming separated from the screw.

It will be apparent that the above construction provides for clamping the head to the swivel at the center of rotation, and that tightening the clamp screw presses the two annular surfaces 42 and 50 tightly and evenly together, thus giving a very even clamping action without the tendency usually found to tilt the head relative to its pivot. It has been found in practice that a miter gauge embodying this feature of the invention is free from the usually found tendency of the head to crawl or get out of adjustment accidentally.

Directly above the rear end of the swivel 44 the body is provided with an arcuate slot 68 extending somewhat more than 60 degrees on each side of the center line, while a pointer 70, secured to the swivel casting 44, extends upwardly through this slot and indicates on a scale 72 the angular relationship existing at any time between the surface 34 and the center line of the bar 26. For convenience in manufacture and assembly, the scale 72 may be embossed on a separate plate which is secured to the head by screws or escutcheon pins 74.

To enable the head to be set quickly and accurately to either end of the scale, in this embodiment with the face 34 inclined at an angle of 30 degrees to the bar 26 in either direction, the under surface of the head has two downwardly projecting wings 76 located near the ends of the arcuate slot 68. Each of these wings 76 is provided with a tapped hole 78 approximately parallel to a line drawn tangentially from the respective end of the arcuate slot 68. These holes 78 contain abutment screws 80 threaded thereinto which may be adjusted to any desired position and there secured by lock nuts 82. Thus, when the head is rotated to either of the 30 degree positions, one of the two vertical sides 83 of the rear portion of the swivel 44 will be brought into contact with the end of one of these screws 80, thereby preventing further movement in that direction. Although these screws are shown adjusted to a position of 30 degrees, they may be set at 45 degrees or at any other position within their limits. It will be seen that although these stops are easily adjustable at the will of the operator, they are out of the way where they will not detract from the appearance of the instrument, nor can they catch in the clothing or get bumped out of adjustment.

Near the forward edge of the head, the casting carries on each side an upstanding boss, the forward surface 85 of which is finished in the same plane as the face 34 and forms an upward extension thereof to aid in supporting a face plate to be described. Each of these bosses 84 is provided with a horizontal hole 86 substantially parallel to the face 34 and through which a round steel extension rod 88 is adapted to pass. The fit between the rod 88 and holes 86 is such that the rod may be easily moved axially to any desired position and there secured by wing screws 90 threaded into the bosses 84 at right angles to the holes 86. A stop rod 92, similar to the extension rod 88 excepting that the outward end is bent over at right angles to form a stop 93, is secured to the extension rod 88 by means of one or more adjustable clamps 94. The above described stop rod and extension rod assembly is provided to aid the operator when several pieces are to be cut to the same length. That is, by loosening the clamp 94 and/or the wing screws 90, the stop 93 is adjusted to the proper distance from the saw blade. When thus adjusted, the clamp 94 and/or the wing screws 90 are tightened. The board or other work is then placed in front of the miter gauge and with one end thereof against the stop 93, the work and miter gauge are pushed forward to make the cut.

The front face 34 is provided with two horizontal slots 96 therethrough arranged one on each side of the center line and the same distance above the lower edge 38. In the embodiment shown, these slots are about 2½ inches long, although they may be longer or shorter, if desired. A face plate 98, which is considerably longer and higher than the face 34, is arranged in front of the face 34 and secured to the head by means of flat head screws 100 extending through countersunk holes 102 in the face plate and through the slots 96. The inward end of each of these screws 100 is provided with two washers 104, a coil spring between the washers, and a nut 108 threaded to the end of the screw to complete the face plate assembly. Preferably the holes 102 should be spaced apart a distance equal to the distance separating the centers of the slots 96. Thus, by tightening the nuts 108 the springs 106 are compressed sufficiently to hold the face plate 98 firmly against the miter gauge head. However, by removing the miter gauge and pressing one end of the face plate against the edge of the saw table, the face plate can be slid from side to side. As a convenience to the operator, a scale 110 may be impressed or engraved along the top edge of the face plate, as shown. Also one end of the face plate may be cut away, as at 112, to permit the operator better to observe the cut being made.

One advantage of this movable face plate is that it enables the use of a longer face than those ordinarily used. That is, since a miter gauge must be reversible—adapted to be used on either side of the saw blade—it follows that the length of the face must be somewhat less than twice the distance between the saw and one of the table slots, as otherwise the face would not clear the saw blade. With the present construction, however, the face plate can be increased in length by an amount substantially equal to the length of the slots 96. This gives a decided advantage inasmuch as the longer the face which can be used, the more rigidly the work can be held and the more accurate the cut which can be made.

Another important advantage of this adjustable face plate is that when making a cut with the miter gauge set at an angle other than 90 degrees, the face plate can be pushed toward the saw to maintain the proper amount of clearance between the end of the face plate and the saw blade. As an example of the above, supposing a table saw in which the distance from the center of the saw blade to the center line of the table slots is 6¾ inches, then the longest nonadjustable face plate that can possibly be used is about 13 inches, thus leaving less than ¼ inch clearance between the saw blade and either end of the face plate. Actually it would not be practical to depend upon a nonadjustable clearance of ¼ inch, since such small clearance would preclude the use of dado heads, but even accepting this dimension for purposes of illustration, when the above miter gauge is set to an angle of 45 degrees, the end of the face plate will be separated from the saw by over 2 inches, thereby making it difficult to miter small pieces. Under the above circumstances, with a miter gauge embodying the present invention, the face plate can be slid about 2¼ inches toward the saw blade, thereby reducing the clearance when mitering at 45 degrees from more than 2 inches to less than ½ inch.

It will thus be observed that I have invented an improved miter gauge which embodies the objects and advantages pointed out earlier in this specification. Although I have, for purposes of illustration, described what I consider to be a preferred embodiment, I contemplate that many departures may be made therefrom without departing from the spirit of the invention, and that the invention is to be measured by the scope of the appended claims.

I claim:

1. A miter gauge comprising a bar adapted to slide longitudinally in a saw table slot, an upstanding member secured near one end of the bar and providing upstanding concentric cylindrical and annular surfaces, the central portion of said member having a threaded hole concentric with said cylindrical surface, a hollow head positioned above said member, a face plate seat on the head, a post projecting downwardly from within said head and providing a seat complementary to the annular and cylindrical surfaces to support the head on the upstanding member in free rotational engagement therewith, a pair of vertical wings extending substantially radially from said post and having horizontal threaded openings therethrough, adjustable stop members threaded in the threaded openings and adapted selectively to abut a portion of said upstanding member when said head is in certain positions relative to said bar, the head having a vertical aperture therethrough axially aligned with the threaded hole, and a clamp screw extending through the last said vertical aperture and threaded in the threaded hole to clamp the head to the upstanding member, the head having a depending peripheral skirt generally semi-cylindrical and terminating in the face plate seat, the skirt being adapted to extend down into close proximity to the plane of the table and, together with the plate and other portions of the head, enclosing the wings and their adjustable stop members.

2. A miter gauge comprising a bar adapted to slide longitudinally in a saw table slot, an upstanding member secured near one end of the bar and providing an upstanding concentric cylindrical surface and an annular horizontal surface extending radially inwardly from the upper end of the cylindrical surface, the central portion of said member having a threaded hole concentric with said cylindrical surface, a hollow head positioned above said member, said head having a seat complementary to the annular and cylindrical surfaces to support said head on the member in free rotational engagement with said surfaces, said head having a vertical aperture therethrough in axial alignment with the threaded hole, an adjustment screw extending through said vertical aperture and threaded in the threaded hole, and an annular shoulder on said screw to clamp the head and the upstanding member together when said screw is tightened, the member and head being free of annular engagement radially beyond said cylindrical surface, the head also having a generaly semi-circular peripheral depending skirt adapted to reach substantially to the plane of the table and, together with the structure of the seat, the top of the head and the table, adapted substantially to enclose said engaging surfaces against the ingress of sawdust.

THERON L. HEDGPETH.